US012229717B2

(12) United States Patent
Hurst et al.

(10) Patent No.: US 12,229,717 B2
(45) Date of Patent: Feb. 18, 2025

(54) TECHNOLOGIES FOR USING MACHINE LEARNING TO MANAGE PRODUCT CATALOGS

(71) Applicant: FETCH REWARDS, LLC, Chicago, IL (US)

(72) Inventors: James Harris Hurst, Birmingham, AL (US); David Berk, Las Vegas, NV (US)

(73) Assignee: Fetch Rewards, LLC, Chicago, IL (US)

( * ) Notice: Subject to any disclaimer, the term of this patent is extended or adjusted under 35 U.S.C. 154(b) by 0 days.

(21) Appl. No.: 18/135,428

(22) Filed: Apr. 17, 2023

(65) Prior Publication Data

US 2024/0346434 A1    Oct. 17, 2024

(51) Int. Cl.
*G06Q 10/087* (2023.01)
*G06N 20/00* (2019.01)

(52) U.S. Cl.
CPC ........... *G06Q 10/087* (2013.01); *G06N 20/00* (2019.01)

(58) Field of Classification Search
CPC .......................... G06Q 10/087; G06N 20/00
See application file for complete search history.

(56) References Cited

U.S. PATENT DOCUMENTS

| 2003/0233350 A1 | 12/2003 | Dedhia et al. |
| 2020/0089800 A1 | 3/2020 | Bhojwani et al. |
| 2020/0151201 A1 | 5/2020 | Chandrasekhar et al. |
| 2021/0279604 A1 * | 9/2021 | Seth ........................ G06N 20/00 |
| 2022/0058227 A1 * | 2/2022 | Balakrishnan ...... G06Q 30/0627 |
| 2023/0042420 A1 * | 2/2023 | Teng ........................ G10L 17/22 |

OTHER PUBLICATIONS

International Search Report and Written Opinion for Application No. PCT/US2024/024198, dated May 22, 2024.

* cited by examiner

*Primary Examiner* — Florian M Zeender
*Assistant Examiner* — Kimberly S. Bursum
(74) *Attorney, Agent, or Firm* — Barnes & Thornburg LLP

(57) ABSTRACT

Systems and methods for using machine learning to dynamically manage product catalogs are disclosed. According to certain aspects, a set of machine learning models may analyze a set of data identifying a product to create or update a data record associated with the product, where the set of machine learning models may include a brand assignment model, a category assignment model, and a tag assignment model. Further, an entity resolution model may refine the data record, which may be organized according to a set of hierarchical data for the product. Additionally, a product catalog may be updated to identify the product according to the set of hierarchical data for the product.

20 Claims, 6 Drawing Sheets

TECHNOLOGIES FOR USING MACHINE LEARNING TO MANAGE PRODUCT CATALOGS

FIELD

The present disclosure is directed to improvements related to managing product catalogs. More particularly, the present disclosure is directed to platforms and technologies for using machine learning techniques to assess product information and generate and update product catalogs accordingly.

BACKGROUND

Building a catalog for consumer packaged goods (CPGs), such as those sold at a retailer, involves a significant amount of time and effort, as well as ongoing maintenance and coordination across multiple teams and channels to ensure accuracy, consistency, and compliance. In particular, one of the main challenges is the sheer volume of products that must be categorized and organized, and because there are often several different products across multiple categories, it can be difficult to create a catalog that is both comprehensive and easy to navigate. Current data ingestion systems rely on third party data providers, the CPGs and manufacturers themselves, and retailer sources to supply product records using various methods (e.g., static files). However, these providers ignore product details and meaningful transaction data on private label products, among other deficiencies. Generally, the current manual ingestion process is time-consuming, leaves gaps in competitive products, and does not enable global reporting and insights because the product data itself is fundamentally biased and limited in scope, among other deficiencies.

Further, there is a need to constantly update and maintain the catalog as new products are introduced, current products are updated, and old products are phased out. Thus, keeping an internal set of product information current and accurate requires ongoing effort and attention. Additionally, it is challenging to ensure that the catalog is easy to use for both customers and employees, as well as easy to search and filter. Moreover, there is a need to ensure that the catalog is consistent across different channels such as online, in-store, and mobile, thus requiring coordination and communication between and among different teams, such as e-commerce, merchandising, and marketing teams.

Accordingly, there is an opportunity for platforms and technologies to efficiently and effectively construct and manage product catalogs.

SUMMARY

In an embodiment, a computer-implemented method of using machine learning to manage a product catalog is provided. The computer-implemented method may include: accessing, by at least one processor, a set of data identifying a product; analyzing, by the at least one processor using a set of machine learning models, the set of data identifying the product to create or update a data record associated with the product; refining, by the at least one processor using an entity resolution model, the data record associated with the product, wherein the data record that was refined is organized according to a set of hierarchical data for the product; and updating, by the at least one processor, the product catalog to identify the product according to the set of hierarchical data for the product.

Further, in an embodiment, a system for using machine learning for managing a product catalog is provided. The system may include a memory storing a set of computer-readable instructions and the product catalog, and one or more processors interfaced with the memory, and configured to execute the set of computer-readable instructions to cause the one or more processors to: access a set of data identifying a product, analyze, using a set of machine learning models, the set of data identifying the product to create or update a data record associated with the product, refine, using an entity resolution model, the data record associated with the product, wherein the data record that was refined is organized according to a set of hierarchical data for the product, and update the product catalog to identify the product according to the set of hierarchical data for the product.

In a further embodiment, a non-transitory computer-readable storage medium configured to store instructions executable by one or more processors is provided. The instructions may include: instructions for accessing a set of data identifying a product; instructions for analyzing, using a set of machine learning models, the set of data identifying the product to create or update a data record associated with the product; instructions for refining, using an entity resolution model, the data record associated with the product, wherein the data record that was refined is organized according to a set of hierarchical data for the product; and instructions for updating the product catalog to identify the product according to the set of hierarchical data for the product.

DETAILED DESCRIPTION

Figure 1A:
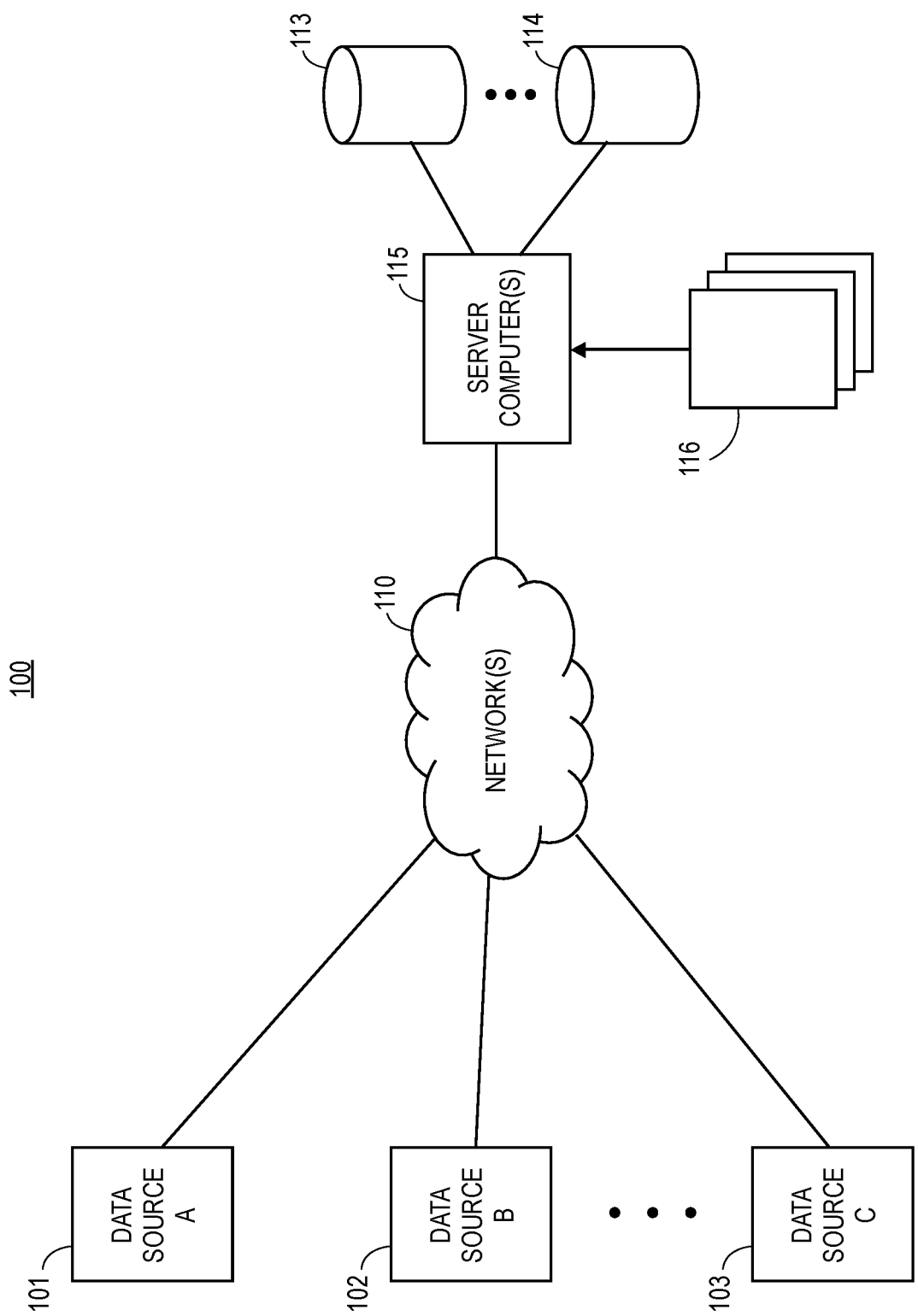
FIG. 1A depicts an overview of components and entities associated with the systems and methods, in accordance with some embodiments.

The present embodiments may relate to, inter alia, using machine learning techniques to build and maintain a product taxonomy. Generally, a product taxonomy is a hierarchical structure used to organize and classify products/items, thus enabling for easier navigation and discovery of products. It typically consists of multiple levels, with each level representing a different category or subcategory. At the top level of the taxonomy, there may be broad, general categories that encompass a wide range of products, where these categories may be based on various factors such as the type of product, its intended use, or its target market.

Lower levels of the taxonomy may correspond to categories that are more specific and narrow, with each level representing a subcategory of the level above it. For example, a top-level category of "Beverages" could have subcategories of "Milk", "Soda", and "Juice". Each of these subcategories could then have their own subcategories, such as "Almond Milk" and "White Milk" under "Milk," and "Grapefruit Juice" and "Apple Juice" under "Juice". The structure of a product taxonomy may be represented in many forms, such as a tree-like structure, directed acyclic graph, or a flat list with predefined relations.

Current data ingestion methods rely on third party retailers, CPG manufacturers, and retailer sources who supply product records by various methods, generally through static files. However, these providers ignore product details and meaningful transaction data on private label products, along with, for example, various generic and un-branded products, such as produce (e.g., fruits and vegetables), meat, and seafood. Additionally, the manual ingestion process is cumbersome and time-consuming, leaves gaps in competitive products, and does not enable global reporting or insights because the product data itself is fundamentally biased and limited in scope.

The described systems and methods generate and maintain a product catalog that supports many different paths of product catalog or product data enrichment, provides a means for deduping, and determines which of records should take precedence when there are multiple different catalogs that present the same information, among other improvements.

The systems and methods may consume product information from multiple different data sources and store it in a datastore. Further, the systems and methods may apply an entity resolution model to the product information, run duplicate detection, rank metadata based on the quality of the information itself as well as the trust-ranking of the data source, and create new or update existing data objects using the highest-ranking product information from its respective associated data record, thereby establishing a composite record of product information. If the entity resolution model generates unexpected results, the systems and methods enable for certain data to be overridden, which provides training data back to the entity resolution model.

The systems and methods may store the new and/or updated data records as higher-confidence product records and use the records to improve internal processes that consume product data, generate product offers, and facilitate other functionalities. Additionally, these higher-confidence data records may be attributed using an extensible framework of metadata which may employ a set of assignment models to extract relevant details, or data tags, from the product metadata (e.g., product type, nutritional claims, packaging format, brand, category, size, etc.), and assign data tags to each product record. In particular, the set of assignment models may be configured to assign, to a given product record, a brand, a category, and/or any additional tags such that the product record is properly categorized under parent categories in a global product taxonomy. Product types, or leaf-node categories in the product taxonomy, may be unique to products within that node, which are in contrast to attributes which may be present across products in different category nodes. As an example, only "black beans" would be present in a leaf node, though "black beans" might share product attributes like "low fat," "reduced sodium," or "canned" with many other products.

The systems and methods may further be configured to customize any export of product data based on a set of needs or preferences of an accessing entity. In particular, for entities submitting product information, the systems and methods may maintain records of the original product metadata supplied, as well as any enriched product metadata that is generated by the systems and methods. This set of preserved fields may include, for example, categories, names, descriptions, brand identifiers, and imagery, where the set of preserved fields may provide flexibility in terms of the order of text identifiers such as names.

The systems and methods represent an improvement to existing technologies, namely product data ingesting systems and product catalog generation systems, among other technologies. In particular, the systems and methods enable for faster ingestion of data associated with newly-manufactured or released products while achieving lower rates of error in the product data itself. The systems and methods employ machine learning techniques that enable real-time or near-real-time ingestion and enriching of product data, and generation and updating of product catalogs. Entities who access information associated with the product catalogs experience reduced access and retrieval latency, and are more assured of accessing accurate and up-to-date information.

The systems and methods incorporate the training and usage of multiple machine learning models. In particular, the systems and methods employ an entity resolution model to automatically match and link multiple mentions of a given product in a datastore. Further, the systems and methods employ additional machine learning models to automatically determine brands, categories, and data tags associated with a set of products.

The use of multiple machine learning models represents an improvement to existing technologies because the models ensure accurate, automatic, and efficient analysis and categorization of product data, resulting in an accurate and usable product catalog for access by various entities. The training and use of the machine learning models enables the systems and methods to process large datasets that the existing systems are unable to analyze as a whole, resulting in improved processing time by the systems and methods. Additionally, by virtue of employing the trained machine learning models in its analyses, the systems and methods reduce the overall amount of data retrieval and communication necessary for the analyses of information associated with one or more products, thereby reducing network traffic and resulting in cost savings. Further, the data resulting from the analyses performed by the machine learning models may be re-input into the machine learning models for improved output on subsequent analyses by the machine learning models.

FIG. 1A illustrates an overview of a system 100 of components configured to facilitate the systems and methods. It should be appreciated that the system 100 is merely an example and that alternative or additional components are envisioned.

As illustrated in FIG. 1A, the system 100 may include a set of data sources 101, 102, 103, such as a set of databases or other types of data sources. According to embodiments, at least one of the data sources 101, 102, 103 may be an electronic device such as a mobile device (e.g., a smartphone), desktop computer, notebook computer, tablet, phablet, GPS (Global Positioning System) or GPS-enabled device, smart watch, smart glasses, smart bracelet, wearable electronic, PDA (personal digital assistant), pager, computing device configured for wireless communication, and/or the like, where the electronic device may be associated with an individual or an entity such as a company, business, corporation, or the like (e.g., a server computer or machine).

The set of data sources 101, 102, 103 may communicate with a server computer(s) 115 via one or more networks 110. In embodiments, the network(s) 110 may support any type of data communication via any standard or technology (e.g., GSM, CDMA, VOIP, TDMA, WCDMA, LTE, EDGE, OFDM, GPRS, EV-DO, UWB, Internet, IEEE 802 including Ethernet, WiMAX, Wi-Fi, Bluetooth, 4G/5G/6G, Edge, and others). The server computer(s) 115 may be associated with an entity such as a company, business, corporation, or the like (generally, a company), and may be configured to create and/or update a catalog associated with a set of products. The server computer(s) 115 may include various components that support communication with the data sources 101, 102, 103.

Generally, the set of data sources 101, 102, 103 may compile, store, access, and/or avail data or information associated with products. In particular, the data or information may include data or information that describes, categorizes, and/or indicates the products. For example, the data or information may include digital images of receipts associated with product purchases. The server computer(s) 115 may analyze this data according to the functionalities as described herein, which may result in a set of training datasets 116. In some implementations, the server computer 115 may access the raw data or information (and/or the training dataset(s) 116) from one or more of the data sources 101, 102, 103. Further, in embodiments, the set of training datasets 116 may originate from another source and may be trained independent of the data that originates from the set of data sources 101, 102, 103.

The server computer 115 may receive, access, or generate the training dataset(s) 116, and may employ various machine learning techniques, calculations, algorithms, and the like to generate a set of machine learning models using the training dataset(s) 116. In particular, the server computer 115 may initially train a set of machine learning models using the training dataset(s) 116 and then apply or input a validation set into a set of generated machine learning models to determine which of the machine learning models is most accurate or otherwise may be used as the final or selected machine learning model(s). According to embodiments, one of the machine learning models may be an entity resolution model.

According to embodiments, the server computer(s) 115 may input, into the generated set of machine learning models, a set of input data that may be the data or information associated with a set of products that is received from the set of data sources 101, 102, 103. The series of machine learning models may analyze the input(s) and output various information associated with a product catalog. In particular, a brand assignment model may analyze a product record to determine a brand to apply to the product record; a category assignment model may analyze a product record to determine a category to apply to the product record; and a tag assignment model may analyze a product record to determine a set of tags to apply to the product record. Further, an entity resolution model may analyze data associated with a given product to update or create a data record associated with the given product. According to embodiments, the server computer(s) 115 may update a product catalog to identify the given product according to the set of hierarchical data for the given product.

The server computer(s) 115 may be configured to interface with or support a memory or storage 113, 114 capable of storing various data, such as in one or more databases or other forms of storage. According to embodiments, the storage 113, 114 may store data or information associated with the machine learning models that are generated by the server computer(s) 115. Additionally, the server computer(s) 115 may access, from the storage 113, 114, data associated with the stored machine learning models to input a set of inputs into the machine learning models. Further, the storage 113, 114 may store data associated with a set of product catalogs.

Figure 1B:
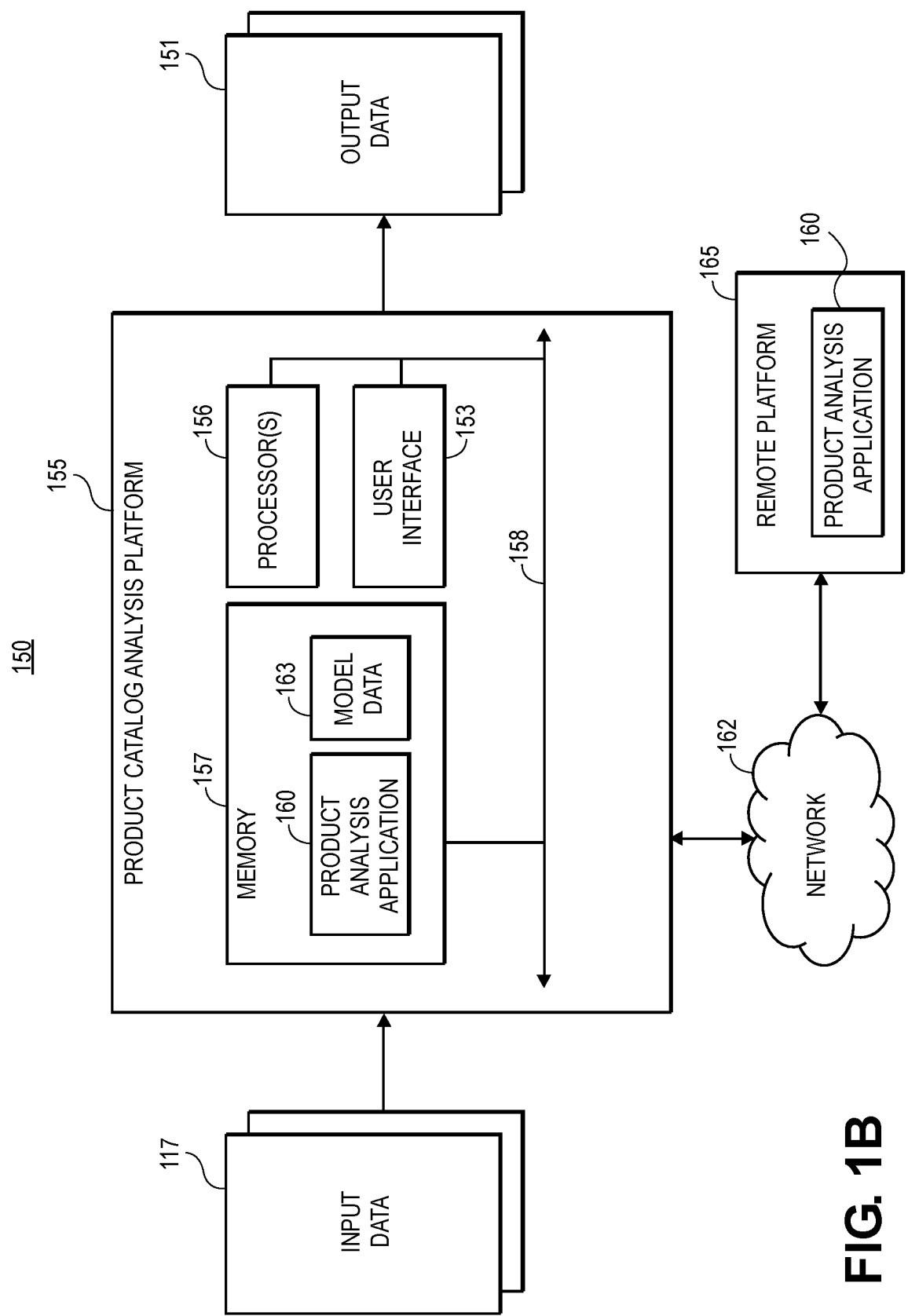
FIG. 1B depicts an overview of certain components configured to facilitate the systems and methods, in accordance with some embodiments.

Although depicted as a single server computer 115 in FIG. 1A, it should be appreciated that the server computer(s) 115 may be in the form of a distributed cluster of computers, servers, machines, cloud-based services, or the like. In this implementation, an accessing entity may utilize the distributed server computer(s) 115 as part of an on-demand cloud computing platform. Accordingly, when the set of data sources 101, 102, 103 interface with the server computer(s) 115, the set of data sources 101, 102, 103 may actually interface with one or more of a number of distributed computers, servers, machines, or the like, to facilitate the described functionalities. Further, although three (3) data sources 101, 102, 103, and two (2) databases 113, 114 are depicted in FIG. 1A, it should be appreciated that greater or fewer amounts are envisioned. FIG. 1B depicts more specific components associated with the systems and methods.

FIG. 1B an example environment 150 in which input data 117 is processed into output data 151 via a product catalog analysis platform 155, according to embodiments. The product catalog analysis platform 155 may be implemented on any computing device or combination of computing devices, including the server computer(s) 115 as discussed with respect to FIG. 1A. Components of the computing device may include, but are not limited to, a processing unit (e.g., processor(s) 156), a system memory (e.g., memory 157), and a system bus 158 that couples various system components including the memory 157 to the processor(s) 156. In some embodiments, the processor(s) 156 may include one or more parallel processing units capable of processing data in parallel with one another. The system bus 158 may be any of several types of bus structures including a memory bus or memory controller, a peripheral bus, or a local bus, and may use any suitable bus architecture. By way of example, and not limitation, such architectures include the Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

The product catalog analysis platform 155 may further include a user interface 153 configured to present content (e.g., input data, output data, processing data, and/or other information). Additionally, a user may review results of a product catalog analysis and make selections to the presented content via the user interface 153, such as to review output data presented thereon, make selections, and/or perform other interactions. The user interface 153 may be embodied as part of a touchscreen configured to sense touch interactions and gestures by the user. Although not shown, other system components communicatively coupled to the system bus 158 may include input devices such as cursor control device (e.g., a mouse, trackball, touch pad, etc.) and keyboard (not shown). A monitor or other type of display device may also be connected to the system bus 158 via an interface, such as a video interface. In addition to the monitor, computers may also include other peripheral output devices such as a printer, which may be connected through an output peripheral interface (not shown).

The memory 157 may include a variety of computer-readable media. Computer-readable media may be any available media that can be accessed by the computing device and may include both volatile and nonvolatile media, and both removable and non-removable media. By way of non-limiting example, computer-readable media may comprise computer storage media, which may include volatile and nonvolatile, removable and non-removable media implemented in any method or technology for storage of information such as computer-readable instructions, routines, applications (e.g., a product analysis application 160), data structures, program modules or other data. Computer storage media may include, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the processor 156 of the computing device.

The product catalog analysis platform 155 may operate in a networked environment and communicate with one or more remote platforms, such as a remote platform 165, via a network(s) 162, such as a local area network (LAN), a wide area network (WAN), or other suitable network. The platform 165 may be implemented on any computing device and may include many or all of the elements described above with respect to the platform 155. In some embodiments, the product analysis application 160 as will be further described herein may be stored and executed by the remote platform 165 instead of by or in addition to the platform 155.

Generally, each of the input data 117 and the output data 151 may be embodied as any type of electronic document, file, template, etc., that may include various graphical/visual and/or textual content, and may be stored in memory as program data in a hard disk drive, magnetic disk and/or optical disk drive in the product catalog analysis platform 155 and/or the remote platform 165. The product catalog analysis platform 155 may support one or more techniques, algorithms, or the like for analyzing the input data 117 to generate the output data 151.

In particular, the product analysis application 160 may analyze various data/information associated with a set of products to create and/or update product records, determine brands and categories for products, determine product data tags, and create and/or update a product catalog(s) based on the determined information. According to embodiments, the product analysis application 160 may use multiple machine learning models in its analyses, and the product catalog(s) may be embodied as the output data 151. The memory 157 may store the output data 151 and other data that the product catalog analysis platform 155 generates or uses in associated with the analysis of the input data 117.

According to embodiments, the product analysis application 160 may employ machine learning and artificial intelligence techniques such as, for example, a regression analysis (e.g., a logistic regression, linear regression, random forest regression, probit regression, or polynomial regression), entity resolution, classification analysis, k-nearest neighbors, decisions trees, random forests, boosting, neural networks, support vector machines, deep learning, reinforcement learning, Bayesian networks, or the like. When the input data 117 is a training dataset(s), the product analysis application 160 may analyze/process the input data 117 to generate a machine learning model(s) for storage as part of model data 163 that may be stored in the memory 157. In embodiments, various of the output data 151 may be added to the machine learning model(s) stored as part of the model data 163. In analyzing or processing the input data 117, the product analysis application 160 may use any of the output data 151 previously generated by the product catalog analysis platform 155.

The product analysis application 160 (or another component) may cause the output data 151 (and, in some cases, the training or input data 117) to be displayed on the user interface 153 for review by the user of the product catalog analysis platform 155, such as to review a certain product catalog(s) and/or results of the machine learning analyses, as part of a dashboard, interface, or the like. The user may select to review and/or modify the displayed data. For instance, the user may review the output data 151 to manually override model outputs, add additional outputs, assess opportunities for promotions or sales, or assess pricing, marketing, or other considerations associated with the distribution and/or sale or products.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processor 156 (e.g., working in connection with an operating systems) to facilitate the functions as described herein. In this regard, the program code may be implemented in any desired language, and may be implemented as machine code, assembly code, byte code, interpretable source code or the like (e.g., via Golang, Python, Scala, C, C++, Java, Actionscript, Objective-C, Javascript, CSS, XML, R, Stata, AI libraries). In some embodiments, the computer program product may be part of a cloud network of resources.

Figure 2:
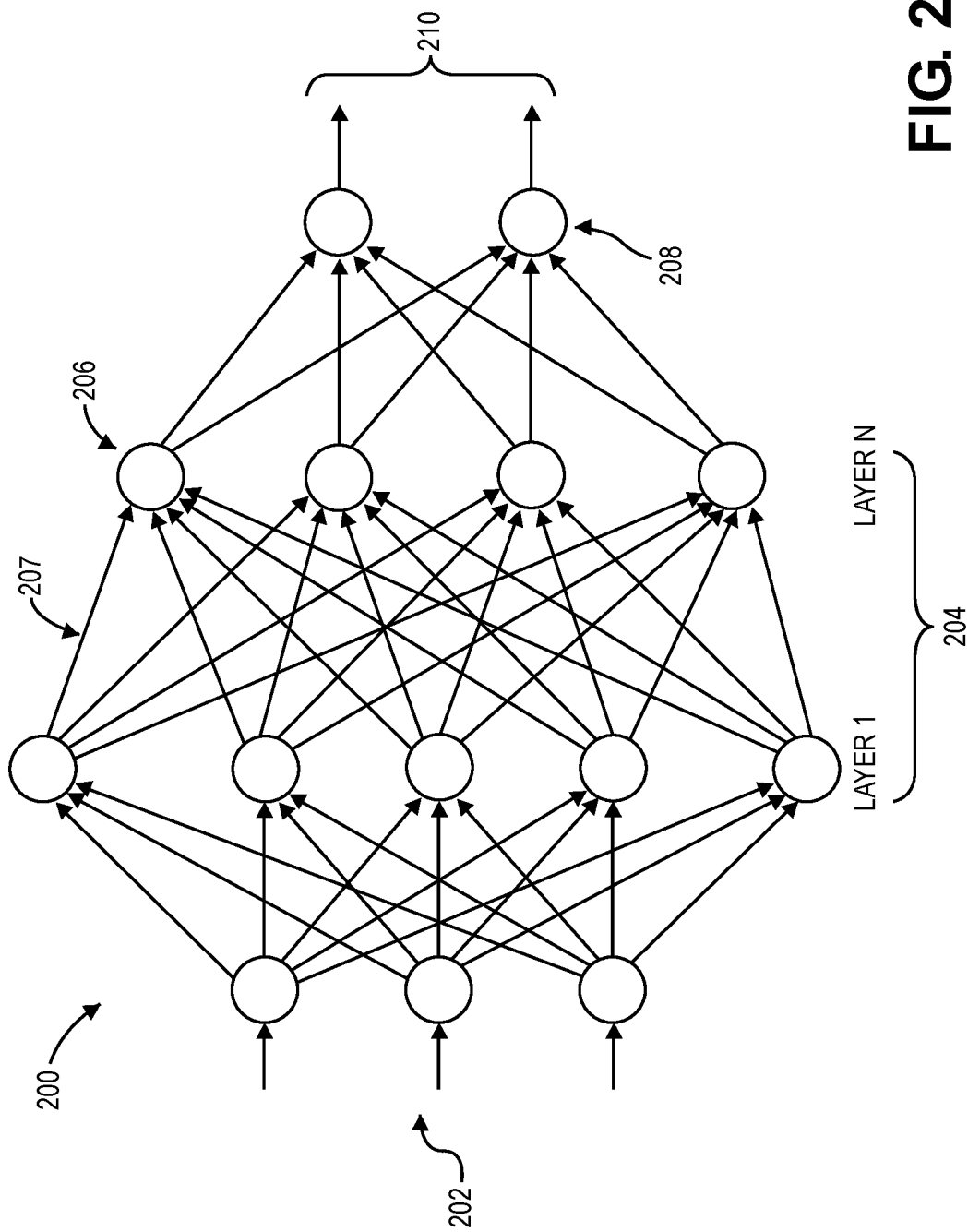
FIG. 2 depicts an exemplary deep learning artificial neural network (DNN) that may be employed by the systems and methods, in accordance with some embodiments.

FIG. 2 depicts an exemplary deep learning artificial neural network (DNN) 200, which may be used in conjunction with the machine learning techniques as discussed herein. The DNN 200 may be trained and/or operated by the product catalog analysis platform 155 of FIG. 1B, for example. The DNN 200 may include a plurality of layers, each of which include any number of respective neurons, or nodes.

The DNN 200 may include an input layer 202, one or more hidden layers 204, and an output layer 208. Each of the layers in the DNN may include an arbitrary number of neurons. The plurality of layers may chain neurons together linearly and may pass output from one neuron to the next, or may be networked together such that the neurons communicate input and output in a non-linear way. In general, it should be understood that many configurations and/or connections of DNNs are possible.

The input layer 202 may correspond to a large number of input parameters (e.g., one million inputs), in some embodiments, and may be analyzed serially or in parallel. Further, various neurons and/or neuron connections within the DNN may be initialized with any number of weights and/or other training parameters. Each of the neurons in the hidden layers 204 may analyze one or more of the input parameters from the input layer 202, and/or one or more outputs from a previous one or more of the hidden layers 204, to generate a decision 210 or other output. The output layer 208 may generate the decision 210 or more outputs, each indicating a prediction or an expected value. The number of input neurons may be stored as a predetermined value, and used to initialize a network for training.

In some embodiments and/or scenarios, the output layer 208 may include only a single output 210. For example, a neuron may correspond to one of the neurons in a hidden layer 206. Each of the inputs to the neuron may be weighted according to a set of weights W1 through Wi (as represented by 207 in FIG. 2), determined during the training process (for example, if the neural network is a recurrent neural network) and then applied to a node that performs an operation a. The operation a may include computing a sum, a difference, a multiple, or a different operation. In some embodiments weights are not determined for some inputs. In some embodiments, neurons of weight below a threshold value may be discarded/ignored. The sum of the weighted inputs, r1, may be input to a function which may represent any suitable functional operation on r1. The output of the function may be provided to a number of neurons of a previous/subsequent layer or as an output 210 of the DNN. In some embodiments, the DNN may include one or more convolutional neural network (CNN) layers.

Figure 3:
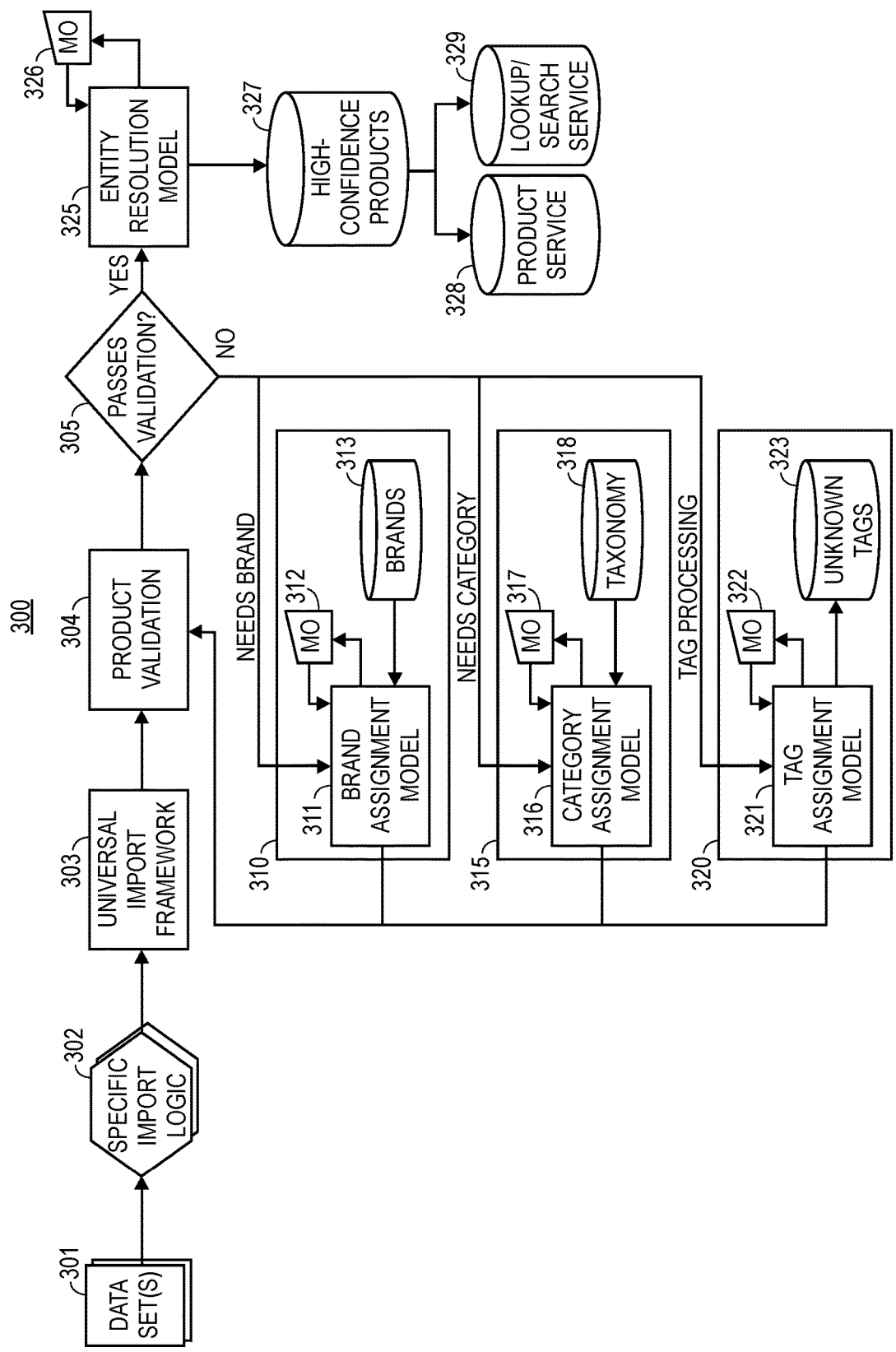
FIG. 3 depicts an example overview of components and functionalities associated with using machine learning to manage a product catalog, in accordance with some embodiments.

FIG. 3 depicts a diagram 300 of various functionalities associated with the described embodiments. It should be appreciated that the components, functionalities, and communication flow are merely exemplary and that alternative or additional components, functionalities, and communication flow are envisioned. One or more computing devices may execute or facilitate the functionalities depicted as part of the diagram 300. For example, the server computer(s) 115 as discussed with respect to FIG. 1A may incorporate or interface with the described components, and may facilitate the described functionalities.

The diagram 300 includes one or more datasets 301 along with a set of specific import logic 302. According to embodiments, the dataset(s) 301 may include one or more of the following: manual edits, receipt scans, partner products, third party products, and/or other datasets, where there may be a specific import logic that corresponds to each of the datasets 301. As such, the set of specific import logic 302 may serve as extract, transform, load (ETL) logic that results in a dataset having consistent formatting, metadata, and the like.

According to embodiments, the partner products dataset may correspond to sets of products from various manufacturers, brands, or the like, and may be organized in any way and according to any schema (e.g., XML, JSON, etc.). Further, the third party product dataset may be a dataset provided by one or more third parties that aggregate data indicative and descriptive of a set of products, where the datasets are typically organized into proprietary formats and hierarchies. Further still, the manual edits dataset may be any edits to existing product data within the catalog, edits to any other of the datasets 301, or supplemental data to any of the datasets 301. Additionally, the other datasets may be datasets obtained through other techniques. Moreover, the receipt scans dataset may include digital images or digital versions of receipts that indicate one or more products or items purchased by one or more consumers, where the receipt scans dataset may originate from electronic devices of the one or more consumers.

Generally, the products or items identified in the datasets 301 may or may not match a product(s) or item(s) that already exists in the catalog. In embodiments, when an unknown product (i.e., a product that does not exist in the catalog) is identified a threshold amount of times by the specific import logic 302, the specific import logic 302 may classify or "flag" the product for inclusion in the catalog and/or datastore. It should be appreciated that additional techniques for identifying unknown products are envisioned.

The diagram 300 further includes a universal import framework 303. Generally, a Universal Product Code (UPC) is a barcode or other identifier used in various countries and jurisdictions. Each UPC consists of numerical digits that uniquely identifies the corresponding product. The universal import framework 303 may be configured to tag or label an identifier (e.g., a UPC) as valid or invalid. In particular, the universal import framework 303 may interface (e.g., via an API) with a database (e.g., GS1 or another data provider) to assess validity of a given product identifier that is included in the datasets 301. Further, the universal import framework 303 may represent a client library for building stream processing applications which may enable developers to process, transform, and analyze data streams.

The diagram 300 includes a product validation component 304, the data from which a validation detection component 305 may be configured to assess and determine what components of the catalog (i.e., "tags") are missing from a given product. According to embodiments, a given product may be missing, in the catalog, one or more tags including a brand and/or a category. Additionally, certain tags may be unclassified. Accordingly, the diagram 300 indicates a set of brand assignment components 310, a set of category assignment components 315, and a set of tag assignment components 320.

According to embodiments, the validation detection component 305 may be configured to assess whether a given product passes validation within the catalog, where the given product passes validation when that product includes a brand and a category, and has its tags processed. If the product does not pass validation ("NO"), processing may proceed to the set of brand assignment components 310 if the brand for the product is missing; or to the set of category assignment components 315 if the category for the product is missing (and the brand for the product is present); or to the set of tag assignment components if there is an unclassified tag(s) (and the rand and category for the product are present).

The set of brand assignment components 310 may be configured to assign a brand to a given product, and may include a brand assignment model 311, a manual override component 312, and a brand datastore 313. Generally, the brand assignment model 311 may analyze data associated with the given product to determine a brand for that given product, where the brand may be from the brand datastore 313 (or, in some cases, from another source). According to embodiments, the brand assignment model 311 may be incorporated as a machine learning model that may be trained using annotated text data that identifies a set of brands for a set of products.

The manual override component 312 may enable a user to correctly identify a brand or correct the brand output by the brand assignment model 311. For example, the brand assignment model 311 may output "Brand X" for a sparkling water product, and a user of the manual override component 312 may replace "Brand X" with "Brand Y" for the sparkling water product. It should be appreciated that any output by the manual override component 312 may serve as additional training data for the brand assignment model 311 such that subsequent analyses performed by the brand assignment model 311 may account for the data from the manual override component 312.

The set of category assignment components 315 may be configured to assign a category to a given product, and may include a category assignment model 316, a manual override component 317, and a taxonomy datastore 318. A category may be any identifier (i.e., noun) for a given product, and labels a broader category or class for the given product, where categorizations generally are used to categorize products into groups based on their general characteristics or types, and may be used for higher-level information retrieval and classification tasks. For example, a can of flavored (lime) sparkling water may have categorizations "beverage," "sparkling water," and "flavored sparkling water."

Generally, the category assignment model 316 may analyze data associated with the given product to determine a category for that given product, where the category may be from the taxonomy datastore 318 (or, in some cases, from another source). According to embodiments, the category assignment model 316 may be incorporated as a machine learning model that may be trained using annotated text data that identifies a set of categories for a set of products.

The manual override component 317 may enable a user to correctly identify a category(ies) or correct the category(ies) output by the category assignment model 316. For example, the category assignment model 316 may output the categories "snack", "potato chips" and "unflavored potato chips" for a potato chip product, and a user of the manual override component 317 may replace "unflavored potato chips" with "flavored potato chips" for the potato chip product. It should be appreciated that any output by the manual override component 317 may serve as additional training data for the category assignment model 316 such that subsequent analyses performed by the category assignment model 316 may account for the data from the manual override component 317.

The set of tag assignment components 320 may be configured to assign a set of tags to a given product, and may include a tag assignment model 321, a manual override component 322, and an unknown tag datastore 323. Generally, the tag assignment model 321 may analyze data associated with a given product to determine, for the given product, a set of details or "tags" for that product including, for example, a name, description, product type, nutritional information, packaging format, size, materials, components, and/or other tags. According to embodiments, the tag assignment model 321 may be incorporated as a machine learning model that may be trained using annotated text data that identifies a set of tags for a set of products.

The manual override component 322 may enable a user to identify additional tags or correct any tags output by the tag assignment model 321. For example, the tag assignment model 321 may not tag a sparkling water product as "water", and a user of the manual override component 322 may append or associate an additional tag "sparkling" for the sparkling water product. It should be appreciated that any output by the manual override component 322 may serve as additional training data for the tag assignment model 321 such that subsequent analyses performed by the tag assignment model 321 may account for the data from the manual override component 322. In the event that the tag assignment model 321 outputs a tag(s) that is unknown or that does not apply to the given product, the tag assignment model 321 may cause that tag(s) to be stored in the unknown tag datastore 323.

When the validation detection component 305 determines that a given product passes validation within the catalog (i.e., when the given product includes a brand and a category, and has its tags processed; "YES"), processing may proceed to an entity resolution model 325 that may operate with a manual override component 326. Generally, the entity resolution model 325 and the manual override component 326 may eliminate, from an initial dataset resulting from functionalities 303, 304, and 305, any records that duplicatively identify products, to arrive at a high-confidence product dataset 327 that may include unique product records, each of which includes useful and as-complete-as-possible data.

The entity resolution model 325 may implement one or more entity resolution techniques to identify and link different mentions of the same product across different data records or datasets. According to embodiments, the entity resolution model 325 may be a machine learning-based entity resolution model that may use algorithms such as decision trees, random forests, or neural networks to learn how to match products, where these models may be trained on a labeled dataset of known matches and non-matches, and can learn to identify matches based on patterns in the data, and ultimately consolidate multiple records into a single, comprehensive view of a product, and to eliminate duplicates, inconsistencies, and errors in the data.

The entity resolution model 325 may be configured to match duplicative product records contained in the initial dataset. Alternatively or additionally, the entity resolution model 325 may be configured to identify which product data record(s) in the initial dataset is already included in the high-confidence product dataset 327. If a given product data record already has a record in the high-confidence product dataset 327, the entity resolution model 325 may identify any data included in the given product data record that builds on or improves the already-existing record, and the entity resolution model 325 may update the product record in the high-confidence product dataset 327 accordingly. Further, the entity resolution model 325 may create, in the high-confidence product dataset 327, a new product record for a product that does not already have a record in the high-confidence product dataset 327. Based on results of the entity resolution model 325, the computing device(s) may perform create, read, update, and/or delete (CRUD) operations accordingly.

For example, a record for a breakfast cereal in the high-confidence product dataset 327 may include a low-resolution image of the cereal. The entity resolution model 325 may examine a record for the cereal in the initial dataset and determine that that record includes a higher-resolution image of the cereal. As a result, the entity resolution model 325 may add the higher-resolution image of the cereal to the record for the cereal in the high-confidence product dataset 327.

According to embodiments, the manual override component 326 may enable for the inspecting and/or overriding of certain determinations made by the entity resolution model 325, such as to correct errors, further enhance product records, and provide additional improvements. Any resolutions may be embodied in additional training data to train the entity resolution model 325, such that subsequent analyses by the entity resolution model 325 may account for the resolutions made via the manual override component 326.

For example, a product record in the high-confidence product dataset 327 may identify a yogurt, but not a flavor of that yogurt. As a result, when the entity resolution model 325 examines product records for the yogurt that identify different flavors, the entity resolution model 325 may not account for the different flavors and may leave the yogurt record in the high-confidence product dataset 327 as-is. In this situation, a user operating the manual override component 326 may specify that the high-confidence product dataset 327 store multiple product records for the yogurt, one for each of the flavors. This resolution may be embodied as training data for the entity resolution model 325, such that in subsequent analysis of product records for the yogurt, the entity resolution model 325 may account for different yogurt flavors, and may create and update product records accordingly.

Data from the high-confidence product dataset 327 may be stored in and/or accessed by a product service database 328. In particular, CRUD (create, read, update, and delete) operations may be performed using the data from the high-confidence product dataset 327 in association with the product service database 328 to ensure that the product service database 328 contains up-to-date data that is reflected in the high-confidence product dataset 327. A lookup/search service dataset 329 may retrieve and enable data from the high-confidence product dataset 327 to be reviewed and edited, for example by a user, component, or entity.

Figure 4:
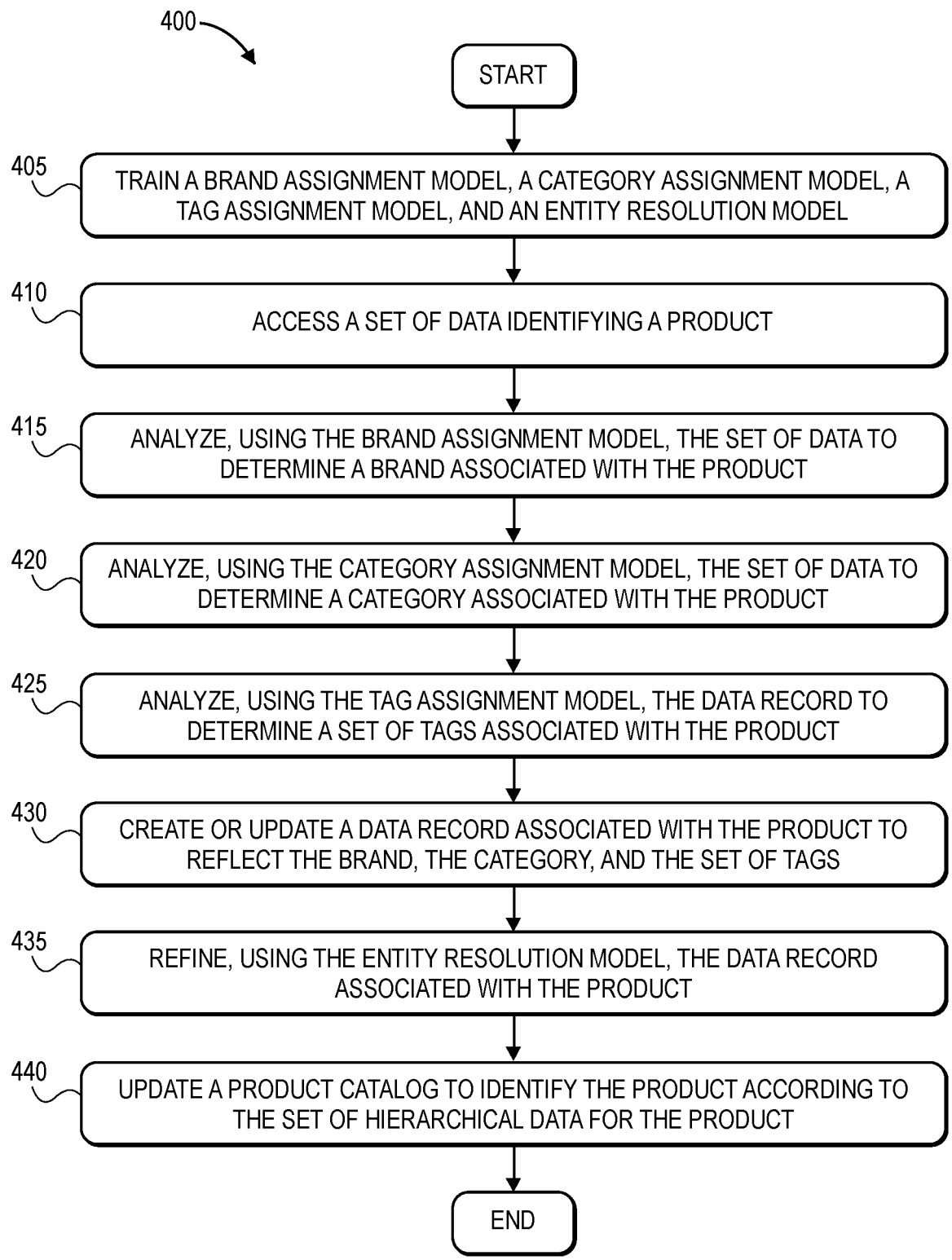
FIG. 4 illustrates an example flow diagram of using machine learning to manage a product catalog, in accordance with some embodiments.

FIG. 4 is a block diagram of an example method 400 of using machine learning to manage a product catalog. The method 400 may be facilitated by one or more electronic devices (such as the server computer 115 as depicted in FIG. 1A).

The method 400 may begin when the electronic device(s) trains (block 405) a set of machine learning models including a brand assignment model, a category assignment model, a tag assignment model and an entity resolution model. According to embodiments, the electronic device may train the brand assignment model, the category assignment model, and the tag assignment model using a set of training datasets each comprising a set of records associated with a set of products, and may train the entity resolution model using an additional training dataset.

The electronic device(s) may access (block 410) a set of data identifying a product. According to embodiments, the electronic device(s) may identify, using the set of data, the product according to at least one rule specific to a type of the set of data.

According to embodiments, the electronic device(s) may determine that data associated with the product is missing and, in response, may analyze the set of data identifying the product to create or update the data record associated with the product. In particular, if the set of data is missing a brand for the product, the electronic device(s) may analyze (block 415), using the brand assignment model, the set of data to determine a brand associated with the product; if the set of data is missing a category for the product, the electronic device(s) may analyze (block 420), using the category assignment model, the set of data to determine a category associated with the product; and/or if the set of data includes unassigned tags for the product, the electronic device(s) may analyze (block 425), using the tag assignment model, the data record to determine a set of tags associated with the product.

The electronic device(s) may create or update (block 430) a data record associated with the product to reflect the brand, the category, and/or the set of tags. Further, the electronic device(s) may refine (block 435), using the entity resolution model, the data record associated with the product. In embodiments, the data record that is refined may be organized according to a set of hierarchical data for the product. The electronic device(s) may further update (block 440) the product catalog to identify the set of hierarchical data for the product.

In embodiments, a taxonomy associated with the product catalog may include a plurality of levels respectively corresponding to a plurality of subcategories, and the electronic device(s) may update the product catalog by: traversing, by the at least one processor, at least a portion of the plurality of levels according to the set of hierarchical data for the product; and based on traversing at least the portion of the plurality of levels, adding a terminal node that identifies the product to the product catalog.

Figure 5:
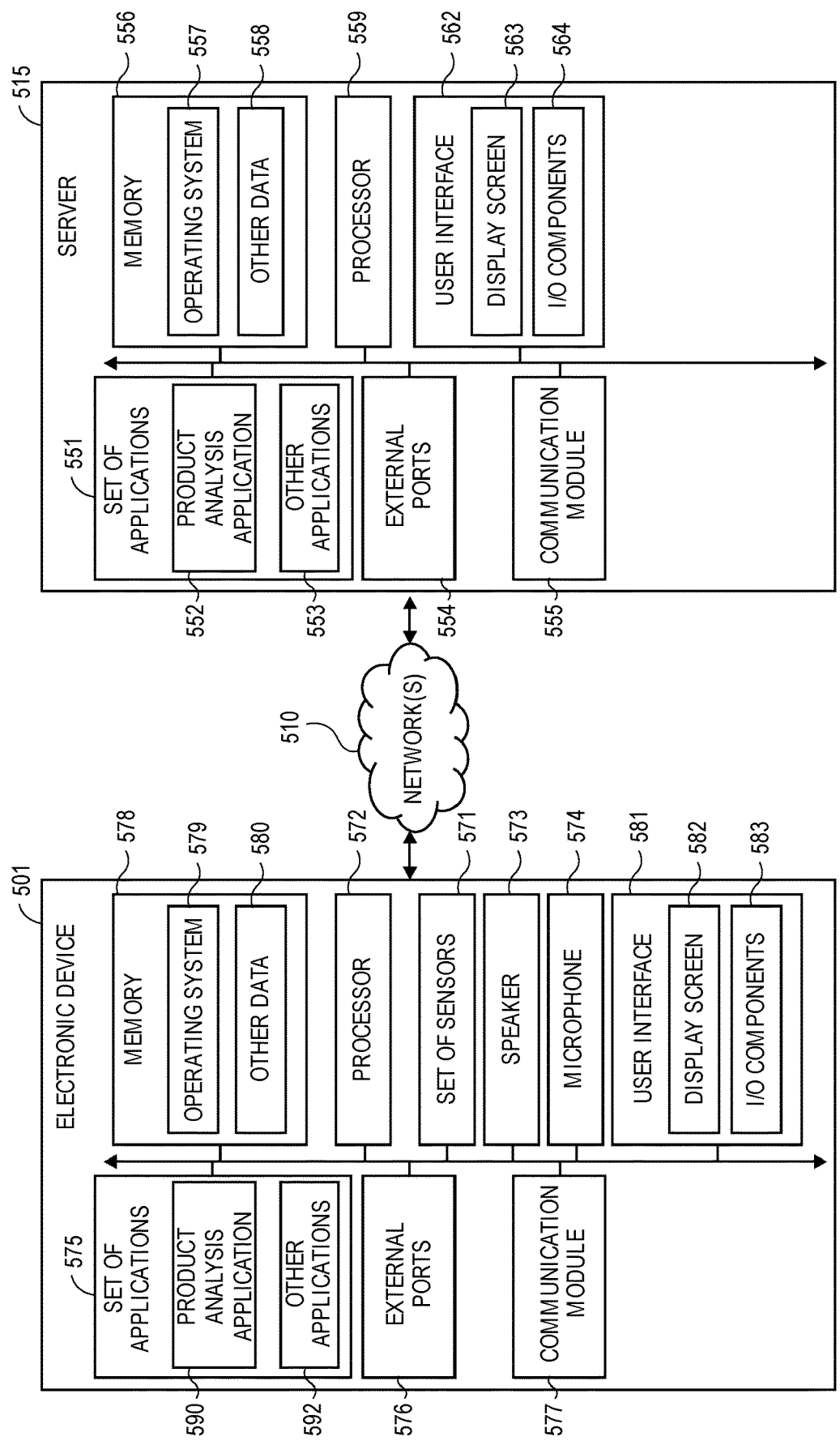
FIG. 5 is an example hardware diagram of an electronic device and a server configured to perform various functionalities, in accordance with some embodiments.

FIG. 5 illustrates a hardware diagram of an example electronic device 501 (e.g., one of the data sources as described with respect to FIG. 1A) and an example server 515 (e.g., the servers 115 as described with respect to FIG. 1A), in which the functionalities as discussed herein may be implemented. It should be appreciated that the components of the electronic device 501 and the server 515 are merely exemplary, and that additional or alternative components and arrangements thereof are envisioned.

The electronic device 501 may include a processor 572 as well as a memory 578. The memory 578 may store an operating system 579 capable of facilitating the functionalities as discussed herein as well as a set of applications 575 (i.e., machine readable instructions). For example, one of the set of applications 575 may be a product analysis application 590, such as to access various data, train machine learning models, and analyze data using the machine learning models. It should be appreciated that one or more other applications 592 are envisioned.

The processor 572 may interface with the memory 578 to execute the operating system 579 and the set of applications 575. According to some embodiments, the memory 578 may also store other data 580, such as machine learning model data and/or other data such product data that may be used in the analyses and determinations as discussed herein. The memory 578 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The electronic device 501 may further include a communication module 577 configured to communicate data via one or more networks 510. According to some embodiments, the communication module 577 may include one or more transceivers (e.g., WAN, WWAN, WLAN, and/or WPAN transceivers) functioning in accordance with IEEE standards, 3GPP standards, or other standards, and configured to receive and transmit data via one or more external ports 576.

The electronic device 501 may include a set of sensors 571 such as, for example, a location module (e.g., a GPS chip), an image sensor, an accelerometer, a clock, a gyroscope (i.e., an angular rate sensor), a compass, a yaw rate sensor, a tilt sensor, telematics sensors, and/or other sensors. The electronic device 501 may further include a user interface 581 configured to present information to a user and/or receive inputs from the user. As shown in FIG. 5, the user interface 581 may include a display screen 582 and I/O components 583 (e.g., ports, capacitive or resistive touch sensitive input panels, keys, buttons, lights, LEDs, and/or built in or external keyboard). Additionally, the electronic device 501 may include a speaker 573 configured to output audio data and a microphone 574 configured to detect audio.

In some embodiments, the electronic device 501 may perform the functionalities as discussed herein as part of a "cloud" network or may otherwise communicate with other hardware or software components within the cloud to send, retrieve, or otherwise analyze data.

As illustrated in FIG. 5, the electronic device 501 may communicate and interface with the server 515 via the network(s) 510. The server 515 may include a processor 559 as well as a memory 556. The memory 556 may store an operating system 557 capable of facilitating the functionalities as discussed herein as well as a set of applications 551 (i.e., machine readable instructions). For example, one of the set of applications 551 may be a product analysis application 552, such as to access various product data, train machine learning models, and analyze data using the machine learning models. It should be appreciated that one or more other applications 553 are envisioned.

The processor 559 may interface with the memory 556 to execute the operating system 557 and the set of applications 551. According to some embodiments, the memory 556 may also store other data 558, such as machine learning model data and/or other data such as product data that may be used in the analyses and determinations as discussed herein. The memory 556 may include one or more forms of volatile and/or nonvolatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The server 515 may further include a communication module 555 configured to communicate data via the one or more networks 510. According to some embodiments, the communication module 555 may include one or more transceivers (e.g., WAN, WWAN, WLAN, and/or WPAN transceivers) functioning in accordance with IEEE standards, 3GPP standards, or other standards, and configured to receive and transmit data via one or more external ports 554.

The server 515 may further include a user interface 562 configured to present information to a user and/or receive inputs from the user. As shown in FIG. 5, the user interface 562 may include a display screen 563 and I/O components 564 (e.g., ports, capacitive or resistive touch sensitive input panels, keys, buttons, lights, LEDs, external or built in keyboard). According to some embodiments, the user may access the server 515 via the user interface 562 to review information, make selections, and/or perform other functions.

In some embodiments, the server 515 may perform the functionalities as discussed herein as part of a "cloud" network or may otherwise communicate with other hardware or software components within the cloud to send, retrieve, or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processors 572, 559 (e.g., working in connection with the respective operating systems 579, 557) to facilitate the functions as described herein. In this regard, the program code may be implemented in any desired language, and may be implemented as machine code, assembly code, byte code, interpretable source code or the like (e.g., via Golang, Python, Scala, C, C++, Java, Actionscript, Objective-C, Javascript, CSS, XML). In some embodiments, the computer program product may be part of a cloud network of resources.

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical.

What is claimed is:

1. A computer-implemented method of using machine learning to manage a product datastore, the computer-implemented method comprising:
   training, by at least one processor, a machine learning-based entity resolution model using a labeled dataset of known matches and non-matches of product records;
   analyzing, by the at least one processor using a set of import logic, an additional dataset received from a data source, including:
      identifying a product that is indicated in the additional dataset,
      determining that the product does not match one of a set of products that exists in the product datastore, and
      in response to determining that the product does not match one of the set of products:
         determining that the set of import logic has identified the product a threshold amount of times, and
         in response to determining that the set of import logic has identified the product the threshold amount of times, classifying the product for inclusion in the product datastore;
   analyzing, by the at least one processor using a set of machine learning models, the additional dataset to create or update a data record associated with the product;
   analyzing, by the at least one processor using the machine learning-based entity resolution model that was trained, the data record associated with the product, including:
      determining that the product has an existing data record in the product datastore, and
      identifying, from the data record, a set of data that is additive to the existing data record;
   updating, by the at least one processor, the existing data record in the product datastore according to the set of data that was identified; and
   re-training, by the at least one processor, the machine learning-based entity resolution model using additional training data comprising a set of resolutions made via a manual override component, wherein the machine learning-based entity resolution model that was re-trained is used for subsequent analyses of data records.

2. The computer-implemented of claim 1, further comprising:

training, by the at least one processor, the set of machine learning models using a set of training datasets each comprising a training set of records associated with a training set of products.

3. The computer-implemented method of claim 1, wherein identifying the product that is indicated in the additional dataset comprises:
identifying the product according to at least one rule specific to a type of the additional dataset.

4. The computer-implemented method of claim 1, wherein analyzing, using the set of machine learning models, the additional dataset comprises:
determining, by the at least one processor, that data associated with the product is missing; and
in response to determining that the data associated with the product is missing, analyzing, by the at least one processor using the set of machine learning models, the additional dataset to create or update the data record associated with the product.

5. The computer-implemented method of claim 1, wherein analyzing, using the set of machine learning models, the additional dataset comprises:
analyzing, using a brand assignment model, the additional dataset to determine a brand associated with the product; and
creating or updating, by the at least one processor, the data record associated with the product to reflect the brand associated with the product.

6. The computer-implemented method of claim 1, wherein analyzing, using the set of machine learning models, the additional dataset comprises:
analyzing, using a category assignment model, the additional dataset to determine a category associated with the product; and
creating or updating, by the at least one processor, the data record associated with the product to reflect the category associated with the product.

7. The computer-implemented method of claim 1, wherein analyzing, using the set of machine learning models, the additional dataset comprises:
analyzing, using a tag assignment model, the additional dataset to determine a set of tags associated with the product; and
creating or updating, by the at least one processor, the data record associated with the product to reflect the set of tags associated with the product.

8. A system for using machine learning for managing a product datastore, comprising:
a memory storing a set of computer-readable instructions and the product datastore; and
one or more processors interfaced with the memory, and configured to execute the set of computer-readable instructions to cause the one or more processors to:
train a machine learning-based entity resolution model using a labeled dataset of known matches and non-matches of product records,
analyze, using a set of import logic, an additional dataset received from a data source, including:
identify a product that is indicated in the additional dataset,
determine that the product does not match one of a set of products that exists in the product datastore, and
in response to determining that the product does not match one of the set of products:
determine that the set of import logic has identified the product a threshold amount of times, and
in response to determining that the set of import logic has identified the product the threshold amount of times, classify the product for inclusion in the product datastore,
analyze, using a set of machine learning models, the additional dataset to create or update a data record associated with the product,
analyze, using the machine learning-based entity resolution model that was trained, the data record associated with the product, including:
determine that the product has an existing data record in the product datastore, and
identifying, from the data record, a set of data that is additive to the existing data record,
update the existing data record in the product datastore according to the set of data that was identified, and
re-train the machine learning-based entity resolution model using additional training data comprising a set of resolutions made via a manual override component, wherein the machine learning-based entity resolution model that was re-trained is used for subsequent analyses of data records.

9. The system of claim 8, wherein the one or more processors is further configured to:
train the set of machine learning models using a set of training datasets each comprising a training set of records associated with a training set of products.

10. The system of claim 8, wherein to identify the product that is indicated in the additional dataset, the one or more processors is configured to:
identify the product according to at least one rule specific to a type of the additional dataset.

11. The system of claim 8, wherein to analyze, using the set of machine learning models, the additional dataset, the one or more processors is configured to:
determine that data associated with the product is missing, and
in response to determining that the data associated with the product is missing, analyze, using the set of machine learning models, the additional dataset to create or update the data record associated with the product.

12. The system of claim 8, wherein to analyze, using the set of machine learning models, the additional dataset, the one or more processors is configured to:
analyze, using a brand assignment model, the additional dataset to determine a brand associated with the product, and
create or update the data record associated with the product to reflect the brand associated with the product.

13. The system of claim 8, wherein to analyze, using the set of machine learning models, the additional dataset, the one or more processors is configured to:
analyzing, using a category assignment model, the additional dataset to determine a category associated with the product, and
create or update the data record associated with the product to reflect the category associated with the product.

14. The system of claim 8, wherein to analyze, using the set of machine learning models, the additional dataset, the one or more processors is configured to:

analyze, using a tag assignment model, the additional dataset to determine a set of tags associated with the product; and create or update the data record associated with the product to reflect the set of tags associated with the product.

15. A non-transitory computer-readable storage medium configured to store instructions executable by one or more processors, the instructions comprising:

instructions for training a machine learning-based entity resolution model using a labeled dataset of known matches and non-matches of product records;

instructions for analyzing, using a set of import logic, an additional dataset received from a data source, including:

instructions for identifying a product that is indicated in the additional dataset, instructions for determining that the product does not match one of a set of products that exists in the product datastore, and instructions for, in response to determining that the product does not match one of the set of products:

instructions determining that the set of import logic has identified the product a threshold amount of times, and instructions for, in response to determining that the set of import logic has identified the product the threshold amount of times, classifying the product for inclusion in the product datastore, instructions for analyzing, using a set of machine learning models, the additional dataset to create or update a data record associated with the product;

instructions for analyzing, using the machine learning-based entity resolution model that was trained, the data record associated with the product, including:

instructions for determining that the product has an existing data record in a product datastore, and instructions for identifying, from the data record, a set of data that is additive to the existing data record; and instructions for updating the existing data record in the product datastore according to the set of data that was identified; and instructions for re-training the machine learning-based entity resolution model using additional training data comprising a set of resolutions made via a manual override component, wherein the machine learning-based entity resolution model that was re-trained is used for subsequent analyses of data records.

16. The non-transitory computer-readable storage medium of claim 15, wherein the instructions further comprise:

instructions for training the set of machine learning models using a set of training datasets each comprising a training set of records associated with a training set of products.

17. The non-transitory computer-readable storage medium of claim 15, wherein the instructions for analyzing, using the set of machine learning models, the additional dataset comprise:

instructions for determining that data associated with the product is missing; and instructions for, in response to determining that the data associated with the product is missing, analyzing, using the set of machine learning models, the additional dataset to create or update the data record associated with the product.

18. The non-transitory computer-readable storage medium of claim 15, wherein the instructions for analyzing, using the set of machine learning models, the additional dataset comprise:

instructions for analyzing, using a brand assignment model, the additional dataset to determine a brand associated with the product; and instructions for creating or updating, by the at least one processor, the data record associated with the product to reflect the brand associated with the product.

19. The non-transitory computer-readable storage medium of claim 15, wherein the instructions for analyzing, using the set of machine learning models, the additional dataset comprise:

instructions analyzing, using a category assignment model, the additional dataset to determine a category associated with the product; and instructions creating or updating the data record associated with the product to reflect the category associated with the product.

20. The non-transitory computer-readable storage medium of claim 15, wherein the instructions for analyzing, using the set of machine learning models, the additional dataset comprise:

instructions analyzing, using a tag assignment model, the additional dataset to determine a set of tags associated with the product; and instructions creating or updating the data record associated with the product to reflect the set of tags associated with the product.

\* \* \* \* \*